United States Patent
Hei et al.

(10) Patent No.: US 12,386,771 B2
(45) Date of Patent: Aug. 12, 2025

(54) CONTROL DEVICE, CONTROL METHOD AND STORAGE MEDIUM

(71) Applicant: Schneider Electric (China) Co., Ltd., Beijing (CN)

(72) Inventors: Minglei Hei, Beijing (CN); Haiqing Lang, Beijing (CN); Qiwei Geng, Beijing (CN); Zejun Hu, Beijing (CN)

(73) Assignee: Schneider Electric (China) Co., Ltd., Beijing (CN)

( * ) Notice: Subject to any disclaimer, the term of this patent is extended or adjusted under 35 U.S.C. 154(b) by 0 days.

(21) Appl. No.: 18/522,879

(22) Filed: Nov. 29, 2023

(65) Prior Publication Data

US 2025/0139042 A1 May 1, 2025

(30) Foreign Application Priority Data

Oct. 26, 2023 (CN) .......................... 202311407362.8

(51) Int. Cl.
*G06F 13/40* (2006.01)

(52) U.S. Cl.
CPC ...... *G06F 13/4068* (2013.01); *G06F 2213/40* (2013.01)

(58) Field of Classification Search
CPC ............. G06F 13/4068; G06F 2213/40; G06F 13/4004; G06F 13/4027; G06F 13/4022; G06F 11/16; G06F 11/1616; G06F 11/1625

See application file for complete search history.

(56) References Cited

U.S. PATENT DOCUMENTS

| | | | |
|---|---|---|---|
| 6,065,068 A | 5/2000 | Foote | |
| 11,316,712 B2* | 4/2022 | Zhan | ...................... H04L 12/66 |
| 2006/0015586 A1 | 1/2006 | Sharma et al. | |
| 2008/0320181 A1 | 12/2008 | Lauterbach et al. | |

(Continued)

OTHER PUBLICATIONS

Extended European Search Report dated May 7, 2024 for corresponding European Patent Application No. 23212365.3-1215, 9 pages.

(Continued)

*Primary Examiner* — Tim T Vo
*Assistant Examiner* — Richard B Franklin
(74) *Attorney, Agent, or Firm* — Troutman Pepper Locke LLP

(57) ABSTRACT

According to embodiments of the present disclosure, there is provided a control device, a control method and a storage medium. The control device comprises: one or more bus units, respectively connected to a bus in the control device; and a first gateway and a second gateway connected to each other, the first and second gateways are respectively connected to the bus and adapted to couple to the controller, wherein the first gateway is configured to perform information exchange between the controller and one or more bus units, and the second gateway is configured to at least partially perform information exchange in response to a fault associated with the first gateway, replacing the first gateway. According to embodiments of the present disclosure, the second gateway can replace the first gateway to perform information exchange between the controller and the bus unit in the event of a fault of the first gateway.

18 Claims, 4 Drawing Sheets

(56) References Cited

U.S. PATENT DOCUMENTS

| | | |
|---|---|---|
| 2012/0254377 A1 | 10/2012 | Bernhard et al. |
| 2013/0282941 A1 | 10/2013 | van Dijk |
| 2013/0301584 A1 | 11/2013 | Addepalli et al. |
| 2016/0179675 A1 | 6/2016 | Fahim et al. |
| 2016/0205066 A1 | 7/2016 | Attarwala et al. |
| 2016/0320993 A1 | 11/2016 | Oota et al. |
| 2022/0141049 A1 | 5/2022 | Lee |
| 2023/0131136 A1 | 4/2023 | Wang et al. |

OTHER PUBLICATIONS

Extended European Search Report dated May 3, 2024 for corresponding European Patent Application No. 23213062.5-1215, 7 pages.
Extended European Search Report dated May 16, 2024 for corresponding European Patent Application No. 23213319.9-1201, 8 pages.
Non-final Office Action dated May 15, 2025 from U.S. Appl. No. 18/521,055, 10 pages.

\* cited by examiner

CONTROL DEVICE, CONTROL METHOD AND STORAGE MEDIUM

FIELD

Example embodiments of the present disclosure generally relate to the field of electrical equipment, and more particularly, to a control device, a control method and a storage medium.

BACKGROUND

With the development of power electronics technology, circuit breakers, contactors, and motor protectors are integrated into one device (such as motor starters), thereby reducing the system size. In this case, each motor starter communicates with a control device (such as a programmable logic controller (PLC)) used for automation control and monitoring through a bus. Multiple such motor starters can be integrated into the same control device, such as a motor control cabinet.

SUMMARY

Embodiments of the present disclosure provides a control device, a control method and a storage medium.

In a first aspect of the present disclosure, there is provided a control device. The device comprises: one or more bus units each connected to a bus in the control device; and a first gateway and a second gateway connected to each other, the first and second gateways each connected to the bus and adapted to be coupled to a controller, wherein the first gateway is configured to perform information exchange between the controller and the one or more bus units, and the second gateway is configured to, in response to a fault associated with the first gateway, to at least partially perform the information exchange in place of the first gateway.

In some embodiments of the first aspect, the second gateway is further configured to: receive operational status data from the first gateway during the first gateway performing the information exchange; monitor the fault associated with the first gateway based on the operational status data; and in response to detecting the fault, at least partially perform the information exchange in place of the first gateway.

In some embodiments of the first aspect, the first and second gateways each comprise a control port and a detection port, the first and second gateways are each adapted to be coupled to the controller via the respective control ports, and the first and second gateways are connected to each other via the respective detection ports to exchange the operational status data.

In some embodiments of the first aspect, the first and second gateways each comprise a control port, a connection port and a detection port, the first and second gateways are each adapted to be coupled to the controller via the respective control ports, the first and second gateways are connected to each other via the respective connection ports to exchange data from or to the controller, and the first and second gateways are connected to each other via the respective detection ports to exchange the operational status data.

In some embodiments of the first aspect, the first and second gateways each comprise two control ports and a detection port, the first and second gateways are each adapted to be coupled to the controller via the respective two control ports, and the first and second gateways are connected to each other via the respective detection ports to exchange the operational status data.

In some embodiments of the first aspect, the first gateway has a first gateway address and the second gateway has a second gateway address independent of the first gateway address, and the first gateway is configured to perform the information exchange according to a correspondence between the first gateway address and a virtual address accessible by the controller.

In some embodiments of the first aspect, the second gateway is further configured to, in response to detecting the fault associated with the first gateway, invalidate the correspondence between the first gateway address and the virtual address, and to validate a correspondence between the second gateway address and the virtual address.

In some embodiments of the first aspect, the first and second gateways each comprise a first switch and a second switch for setting a primary gateway and a standby gateway, the first gateway is further configured to perform the information exchange as the primary gateway based on a first control signal from the first switch, and the second gateway is further configured to monitor the fault associated with the first gateway as the standby gateway based on a second control signal from the second switch.

In some embodiments of the first aspect, the first gateway is configured to output a first ON signal via a first pin to control a first resistor associated with the first gateway to be connected to a circuit of the bus; and the second gateway is configured to output a first OFF signal via a second pin to control the second resistor associated with the second gateway to be disconnected from the circuit of the bus.

In some embodiments of the first aspect, the second gateway is further configured to, in response to detecting the fault, generate a second ON signal and output the second ON signal via the second pin to control the second resistor to be connected to the circuit of the bus; and the first gateway is configured to, in response to the second gateway operating in place of the first gateway, output a second OFF signal via the first pin to control the first resistor to be disconnected from the circuit of the bus.

In a second aspect of the present disclosure, there is provided a control method implemented at a control device comprising a first gateway and a second gateway connected to each other, the method comprising: performing, by the first gateway, information exchange between the controller and one or more bus units in the control device, the one or more bus units each connected to a bus in the control device, the first and second gateways each connected to the bus and adapted to be coupled to the controller; and in response to a fault associated with the first gateway, at least partially performing the information exchange by the second gateway in place of the first gateway.

In some embodiments of the second aspect, at least partially performing the information exchange by the second gateway in place of the first gateway comprises: receiving operational status data from the first gateway by the second gateway during the first gateway performing the information exchange; monitoring, by the second gateway, the fault associated with the first gateway based on the operational status data; and in response to detecting the fault, at least partially performing the information exchange by the second gateway in place of the first gateway.

In some embodiments of the second aspect, the first and second gateways each comprise a control port and a detection port, the first and second gateways are each adapted to be coupled to the controller via the respective control ports, and the first and second gateways are connected to each other via the respective detection ports to exchange the operational status data.

In some embodiments of the second aspect, the first and second gateways each comprise a control port, a connection port and a detection port, the first and second gateways are each adapted to be coupled to the controller via the respective control ports, the first and second gateways are connected to each other via the respective connection ports to exchange data from or to the controller, and the first and second gateways are connected to each other via the respective detection ports to exchange the operational status data.

In some embodiments of the second aspect, the first and second gateways each comprise two control ports and a detection port, the first and second gateways are each adapted to be coupled to the controller via the respective two control ports, and the first and second gateways are connected to each other via the respective detection ports to exchange the operational status data.

In some embodiments of the second aspect, the first gateway has a first gateway address and the second gateway has a second gateway address independent of the first gateway address, and wherein performing the information exchange by the first gateway comprises: performing the information exchange by the first gateway according to a correspondence between the first gateway address and a virtual address accessible by the controller.

In some embodiments of the second aspect, the method further comprises: in response to detecting the fault associated with the first gateway, invalidating the correspondence between the first gateway address and the virtual address and validating a correspondence between the second gateway address and the virtual address by the second gateway.

In some embodiments of the second aspect, the first and second gateways each comprise a first switch and a second switch for setting a primary gateway and a standby gateway, and the method further comprises: performing the information exchange by the first gateway as the primary gateway based on a first control signal from the first switch; and monitoring the fault associated with the first gateway by the second gateway as the standby gateway based on a second control signal from the second switch.

In some embodiments of the second aspect, the method further comprises: outputting a first ON signal via a first pin by the first gateway to control a first resistor associated with the first gateway to be connected to a circuit of the bus; and outputting a first OFF signal via a second pin by the second gateway to control the second resistor associated with the second gateway to be disconnected from the circuit of the bus.

In some embodiments of the second aspect, the method further comprises: in response to detecting the fault, generating a second ON signal and outputting the second ON signal via the second pin by the second gateway, to control the second resistor to be connected to the circuit of the bus; and in response to the second gateway operating in place of the first gateway, outputting a second OFF signal by the first gateway via the first pin, to control the first resistor to be disconnected from the circuit of the bus.

In the third aspect of this disclosure, a machine-readable storage medium is provided. The machine-readable storage medium stores a program that can be executed by a processor to implement the method of the second aspect.

It will be understood from the following description that according to embodiments of the present disclosure, a scheme including multiple gateways is provided for information exchange between a controller and a bus unit. In the event of a fault associated with one gateway, information exchange can be performed at least partially by another gateway. In this way, in the event of a gateway fault, information exchange between the controller and the bus unit can still be stable. In this way, the stability and reliability of device communication can be improved. Other benefits will be described below in conjunction with the corresponding embodiments.

It should be understood that the content described in this section is not intended to limit the key features or important features of embodiments of the present disclosure, nor is it intended to limit the scope of the present disclosure. Other features of the present disclosure will become readily understood by the following description.

BRIEF DESCRIPTION OF THE DRAWINGS

In conjunction with the accompanying drawings and with reference to the following detailed description, the above and other features, advantages and aspects of the embodiments of the present disclosure will become more apparent.

DETAILED DESCRIPTION

Figure 1:
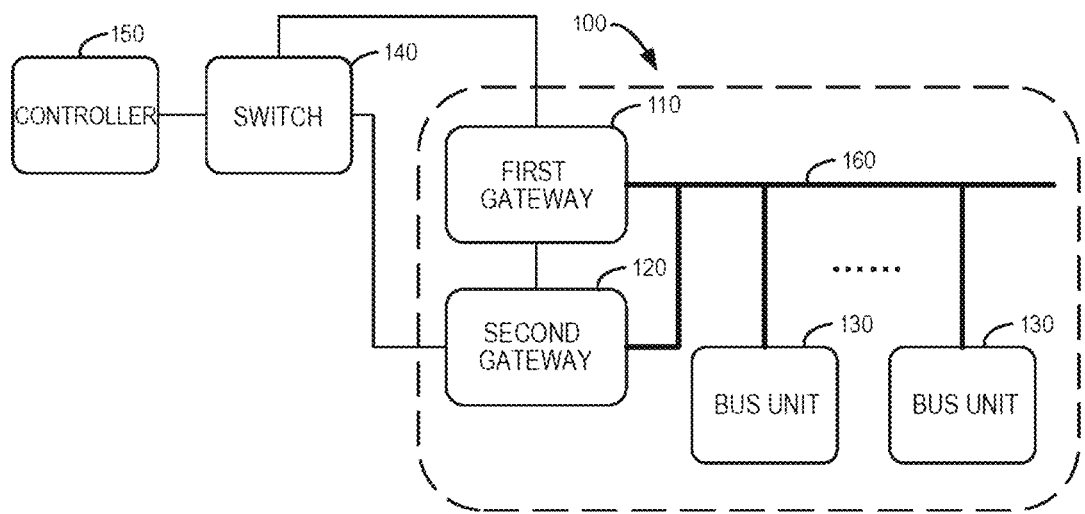
FIG. 1 shows a schematic topology of a control device according to some embodiments of the present disclosure.

The following will describe embodiments of the present disclosure in more detail with reference to the accompanying drawings. Although certain embodiments of the present disclosure are shown in the drawings, it should be understood that the present disclosure can be implemented in various forms and should not be construed as limited to the embodiments set forth herein. On the contrary, these embodiments are provided for a more thorough and complete understanding of the present disclosure. It should be understood that the drawings and embodiments of the present disclosure are for illustrative purposes only and are not intended to limit the scope of protection of the present disclosure.

In the description of embodiments of the present disclosure, the term "including" and similar terms should be understood as open-ended inclusion, that is, "including but not limited to". The term "based on" should be understood as "at least partially based on". The term "one embodiment" or "the embodiment" should be understood as "at least one embodiment". The term "some embodiments" should be understood as "at least some embodiments". The following may also include other explicit and implicit definitions. The terms "first", "second", etc. may refer to different or identical objects. The following may also include other explicit and implicit definitions.

As briefly mentioned earlier, circuit breakers, contactors, and motor protectors can be integrated into a motor starter (also known as a motor starter and protector). A motor control cabinet (e.g., motor control center MCC) can include several (e.g., 8-16) motor starters. Each motor starter can communicate with the PLC device via the physical protocol interface of the motor protector. With the development of power electronics technology, motor control cabinets can integrate more motor starters, such as 64. In this case, if all motor starters exchange information with the PLC through a gateway, many problems will be faced. For example, when this gateway fails, it will affect the communication between all motor starters and PLC devices, resulting in excessive losses caused by a single point of fault in the system.

The problems confronted by the control device in configuring a large number of bus units are described as examples using the control device as a motor control cabinet and the bus unit as a motor starter. To solve or at least partially solve such problems, embodiments of the present disclosure provide a scheme for supporting information exchange between a bus unit and a controller using a plurality of gateways. According to embodiments of the present disclosure, the control device includes one or more bus units and a first gateway and a second gateway connected to each other. One or more bus units are respectively connected to the bus in the control device. The first and second gateways are each connected to the bus and adapted to be coupled to the controller. The first gateway is configured to perform information exchange between the controller and the one or more bus units, and the second gateway is configured to at least partially perform the information exchange in place of the first gateway in response to a fault associated with the first gateway.

In this way, when a gateway is suffering from a fault, another gateway can at least partially take over the communication between the bus device and the controller. In this way, the stability and reliability of device communication can be improved.

Some example embodiments of the present disclosure will be described below with reference to the accompanying drawings. Please note that in several descriptions of embodiments, in order to better assist readers in understanding, certain specific numerical values may be involved. These numerical values are exemplary and may vary according to specific application scenarios, and do not limit the scope of the present disclosure in any way.

A schematic diagram of the topology of a control device according to some embodiments of the present disclosure will be described below in conjunction with FIG. 1. As shown, the control device 100 may include one or more bus units 130. A bus unit 130 may include various suitable devices required in the control device 100. In some embodiments, the bus unit 130 may be implemented in the form of a drawer and may therefore also be referred to as a drawer. Accordingly, the control device 100 may also be referred to as a drawer cabinet. In some embodiments, the control device 100 may be a motor control cabinet and the bus unit 130 may be a motor starter.

In some embodiments, a plurality of bus units 130 are physically connected to the bus 160 through the backplane connector, so that the bus units 130 may share power and data signals. In addition, the backplane connector also provides mechanical stability and reliability, to ensure that each bus unit 130 is properly inserted and good contact.

The control device 100 also includes a first gateway 110 and a second gateway 120 connected to each other to achieve a redundant configuration of the gateway. For example, the first gateway 110 and the second gateway 120 can be connected to each other via Ethernet. With such a connection, the two gateways can exchange operational data with each other to determine whether each other is operating normally and/or synchronize configuration and operating status.

Both the first gateway 110 and the second gateway 120 can be implemented through hardware devices or software for address allocation and translation, data processing and analysis, protocol conversion, routing, and other functions. The first gateway 110 and the second gateway 120 are each connected to the bus 160. For example, the bus 160 can be respectively connected to the first gateway 110 and the second gateway 120 in a one-to-two structure. The bus 160 is used to control communication between various parts within the control device 100, and is therefore also called an internal communication bus. The bus 160 can be any suitable type or follow any suitable protocol. For example, the bus 160 can be a controller area network (CAN) bus.

The control device 100 can communicate with the controller 150. For example, the control device 100 can receive and execute instructions from the controller 150 and return corresponding data to the controller 100. Specifically, the control device 100 communicates with the controller 150 through at least one gateway in the first gateway 110 and the second gateway 120.

The first gateway 110 and the second gateway 120 are adapted to be coupled to the controller 150. In some embodiments, as shown in FIG. 1, the first gateway 110 and the second gateway 120 may be coupled to the controller 150 via the switch 140 to communicate with the controller 150. For example, the connection between the first gateway 110 and the second gateway 120 are connected to the controller 150 can be an Ethernet connection. In other embodiments, the control device 100 and the controller 150 can be connected without a switch. For example, the first gateway 110 and the second gateway 120 may be directly connected to the controller 150. Embodiments of the present disclosure are not limited in this respect.

One of the first gateway 110 and the second gateway 120 acts as a primary gateway to perform information exchange between the controller 150 and the bus unit 130. The other gateway acts as a standby gateway to at least partially perform the information exchange in place of the primary gateway in the event of a fault associated with the primary gateway.

Assume that the first gateway 110 is used as the primary gateway and the second gateway 120 is used as the standby gateway, for example. During the information exchange performed by the first gateway 110 as the primary gateway, the second gateway 120 as the standby gateway can receive operational status data from the first gateway 110 (e.g., through their connection). Based on the operational status data, the second gateway 120 can monitor faults associated with the first gateway 110. Such faults may include, for example, a fault in the first gateway 110 per se, a fault in the coupling line between the first gateway 110 and the controller 150, a fault in the connection between the first gateway 110 and the bus 160, etc. If a fault is detected, the second gateway 120 can at least partially perform the information exchange in place of the first gateway 110 to.

In other words, in operation of the primary gateway, the standby gateway can determine whether there is a fault related to the primary gateway from the operational status data of the primary gateway. Once a fault is detected, the standby gateway can at least partially take over the information exchange between the bus unit 130 and the controller 150.

In some embodiments, controller 150 may be a PLC. control device 100 may be a motor control center (MCC), and the first gateway 110 and the second gateway 120 may be header devices of the MCC. bus unit 130 may be a motor starter (such as an integrated circuit breaker, contactor, and motor protector motor starter).

The control device 100 shown in FIG. 1 and connected to the external controller 150 is merely for illustration and not intended to suggest any limitations. In some embodiments, the control device 100 may include more gateways, such as three or more, to achieve communication redundancy to a greater extent.

In order to implement the communication scheme of the primary gateway and the standby gateway, various suitable topologies can be used for the connection between the first gateway 110 and the second gateway 120 and their connections with external devices. Some examples are described below with reference to FIGS. 2A to 2C.

In some embodiments, the first gateway 110 and the second gateway 120 may each include a control port and a detection port. The first gateway 110 and the second gateway 120 may be each adapted to be coupled to the controller 150 via their respective control ports. The first gateway 110 and the second gateway 120 are connected to each other via their respective detection ports to exchange operational status data. In this embodiment, if there is a fault on the line coupling the primary gateway and the controller 150, the standby gateway detects this situation and can immediately operate to take over the information exchange between the controller 150 and the control device 100.

Figure 2A:
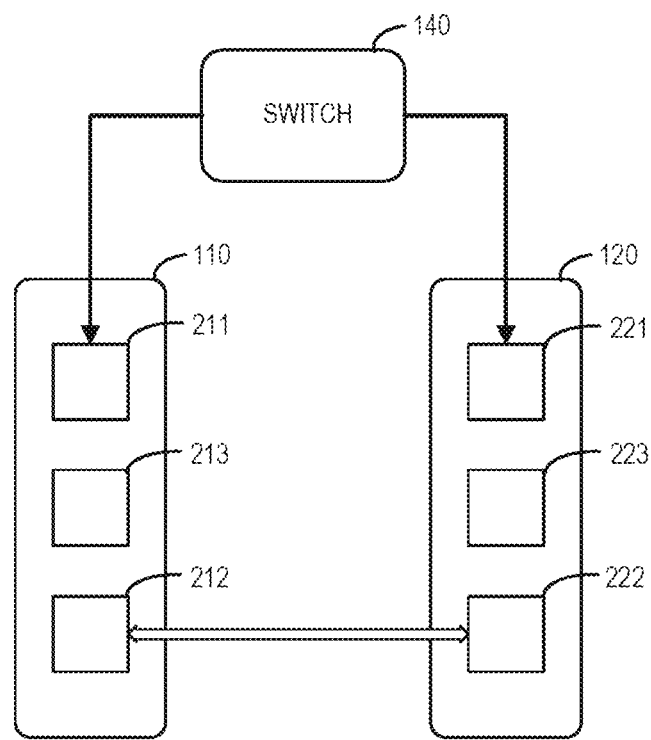
FIG. 2A to 2C show schematic diagrams of the connection of the first and second gateways according to some embodiments of the present disclosure.

For example, in the example of FIG. 2A, the first gateway 110 includes a first control port 211 and a first detection port 212. The second gateway 120 includes a second control port 221 and a second detection port 222. The first control port 211 and the second control port 221 can be used to implement a connection between the switch 140 and the respective gateways, to transmit information exchanged between the control device 100 and the controller 150. The first detection port 212 and the second control port 221 can be used to implement interconnection between these two gateways, so that the gateways can perform operations such as heartbeat detection and configuration synchronization for each other. In some embodiments, the first detection port 212 and the second detection port 222 can be connected by Ethernet.

In the example of FIG. 2A, a simple topology is used between the gateway and the switch 140. The first control port 211 on the first gateway 110 is connected to a port of the switch 140, and the first detection port 212 is connected to the second detection port 222 of the second gateway 120. The second control port 221 of the second gateway 120 is connected to another port of the switch 140. In this example, the first control port 211 and the second control port 221 are adapted to be connected to the switch 140. In some cases, however, it is not required that the first control port 211 and the second control port 221 are connected to the switch 140 but can instead be connected to the controller 150 directly. In such an embodiment, the topology is simple and the connection is easy to install.

In some embodiments, the first gateway 110 and the second gateway 120 can each include a control port, a connection port, and a detection port. The first gateway 110 and the second gateway 120 may be each adapted to be coupled to the controller 150 via their respective control ports. The first gateway 110 and the second gateway 120 may be connected to each other via the respective connection ports to exchange data from or to the controller 150. The first gateway 110 and the second gateway 120 may be connected to each other via the respective detection ports to exchange operational status data.

An example is described with reference to FIG. 2B. In this example, a ring network structure is used between the gateway and the switch 140, and a first communication protocol is adopted. The first control port 231 on the first gateway 110 is connected to a port of the switch 140 and the first connection port 233 is connected to the second connection port 243 of the second gateway 120. The second control port 241 of the second gateway 120 is connected to another port of the switch 140, and the second detection port 242 is connected to the first detection port 232 of the first gateway 110. In such an embodiment, if there are any disconnections between the first gateway 110 and the switch 140 or between the second gateway 120 and the switch 140, the network can be quickly restored by the first communication protocol. The exchanged data can be transmitted to the first gateway 110 through the connection between the first gateway 110 and the second gateway 120. Thus, there is no need to completely switch to the second gateway 120. For example, the first communication protocol can be the Fast Spanning Tree Protocol (RSTP).

In some embodiments, the first gateway 110 and second gateway 120 can each include two control ports and a detection port. The first gateway 110 and second gateway 120 may be each adapted to be coupled to the controller 150 through their respective two control ports and may be connected to each other through their respective detection ports to exchange operational status data.

An example is described with reference to FIG. 2C. In this example, a dual-port redundant load balancing structure is used between the gateway and the switch 140, and a second communication protocol is used on two lines connected to the same gateway. Each of the first control ports 251 on the first gateway 110 is connected to the switch 140, and the second communication protocol is enabled on the two lines connecting the switch 140 and these two first control ports 251. Likewise, each of the second control ports 261 on the second gateway 120 is connected to the switch 140, and the second communication protocol is enabled on the two lines connecting the switch 140 and these two second control ports 261. The first detection port 252 of the first gateway 110 and the second detection port 262 of the second gateway 120 are connected to each other to exchange operational status data and synchronization configuration data. In such an embodiment, if one of the two lines connecting the switch 140 and the same gateway is disconnected, the second communication protocol can process all traffic on the other line, without impacting information exchange between the gateway and switch 140. This further improves the communication stability of the device. In some embodiments, the second communication protocol may be a bond protocol or a team protocol.

Figure 2B:
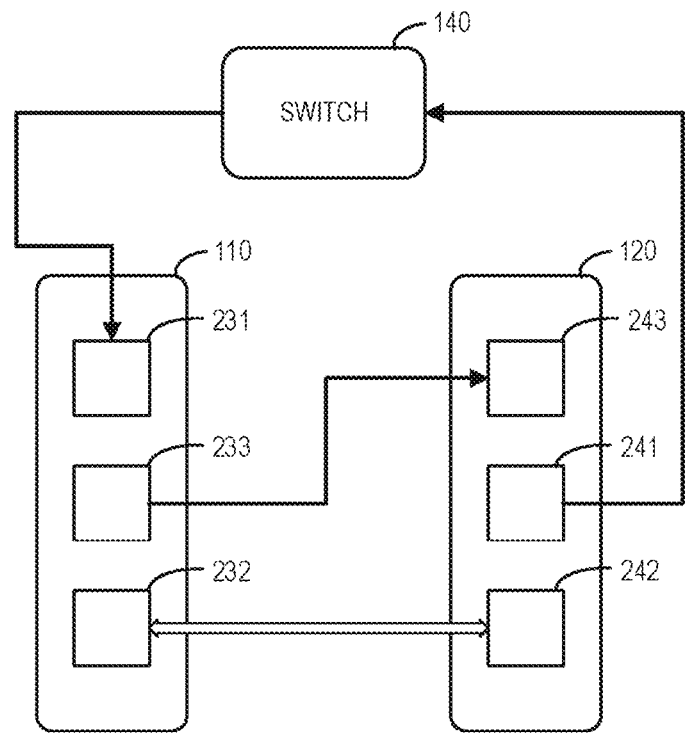
Figure 2C:
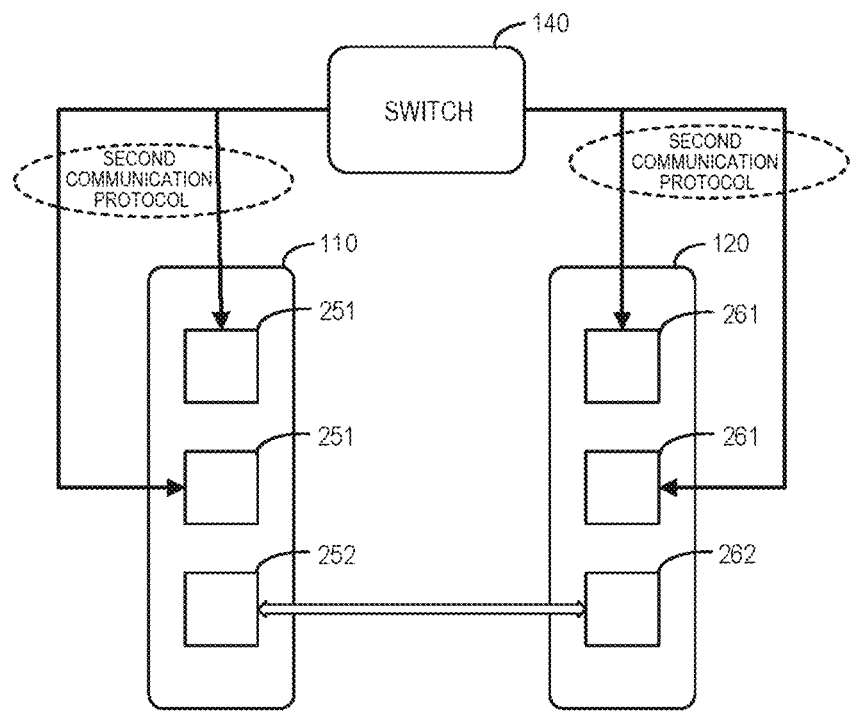

It should be understood that the ways for connections in the examples of FIGS. 2A to 2C are only for illustration and can vary according to specific application scenarios, without suggesting any limitations as to the scope of the present disclosure.

Figure 3:
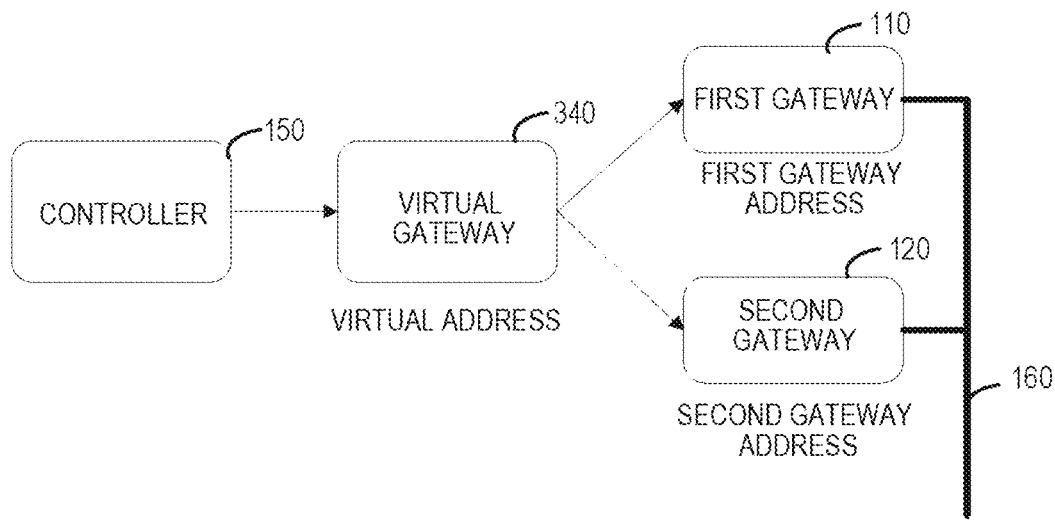
FIG. 3 shows a schematic view of a controller accessing a virtual gateway associated with a first gateway and a second gateway according to some embodiments of the present disclosure.

An example implementation of communication between the gateway and the controller is described below. FIG. 3 shows a schematic diagram of the controller accessing the virtual gateway associated with the first gateway 110 and the second gateway 120. As shown, the first gateway 110 and the second gateway 120 have independent first gateway addresses and second gateway addresses, respectively. The third communication protocol can be enabled on the first gateway 110 and the second gateway 120 to generate a virtual address (VIP) that can be accessed by the controller 150. That is, from the perspective of the controller 150, it communicates with the virtual gateway 340 with the virtual address. In the case of operating as a primary gateway, the first gateway 110 can perform information exchange between the controller 150 and the bus 160 based on the correspondence between the first gateway address and the virtual address. In other words, in this case, the virtual address points to the first gateway 110 as the primary gateway. When the controller 150 accesses the virtual address, it actually accesses the primary gateway.

In operating as a standby gateway, the second gateway 120 is able to, in the case of detecting a fault associated with the first gateway 110, invalidate the correspondence between the first gateway address and the virtual address and validate the correspondence between the second gateway address and the virtual address, thereby performing at least part of information exchange between the controller 150 and the bus 160 in place of the first gateway 110. As an example, in the case where the standby gateway detects a fault associated with the primary gateway, the standby gateway can obtain ownership of the virtual address through the third communication protocol. Then, when the controller 150 accesses the virtual address, it actually accesses the standby gateway. The third communication protocol can be Virtual Router Redundancy Protocol (VRRP), for example. In this embodiment, the controller 150 can switch between the primary gateway and the standby gateway insensibly by use of the virtual address.

Figure 4:
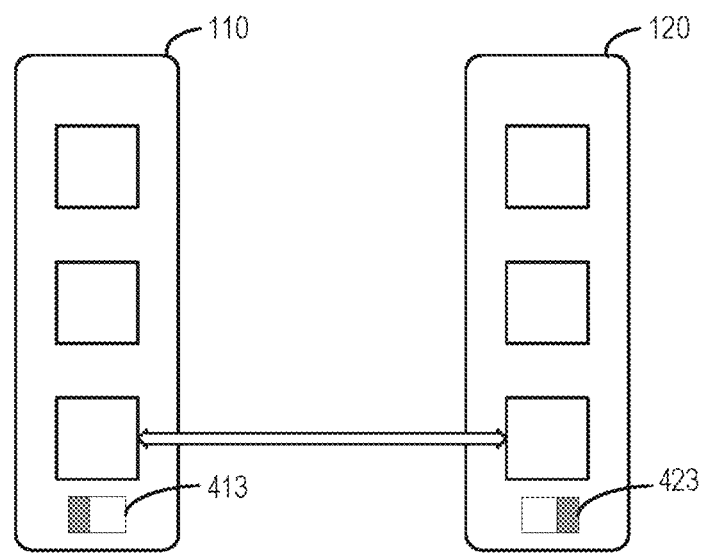
FIG. 4 shows a schematic diagram of a first switch and a second switch according to some embodiments of the present disclosure.

In some embodiments, when two gateways are started at the same time, in order to ensure the expected active and standby states, it is possible to provide the gateways with mechanisms for specifying the initial states (active or standby), such as switches. FIG. 4 shows a schematic diagram of the first and second switches according to some embodiments of the present disclosure. In some embodiments, the first gateway 110 includes a first switch 413 and the second gateway 120 includes a second switch 423. Each of such switches can be used to set whether the gateway is a primary gateway or a standby gateway. By way of example, the first gateway 110 can operate as a primary gateway based on a first control signal from the first switch 413. The second gateway 120 can operate as a standby gateway based on a second control signal from the second switch 423. By setting such switches on the gateways, the user can specify the primary and standby gateways when starting the gateways. Thus, confusion between the primary and standby roles can be avoided.

Figure 5:
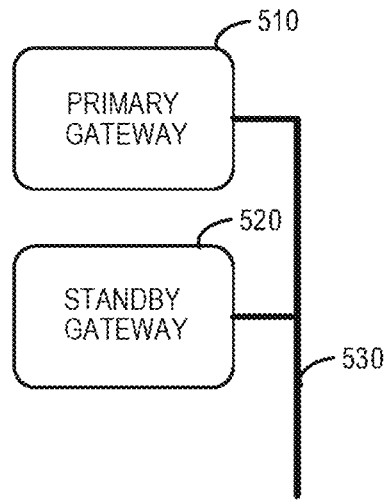
FIG. 5 shows a schematic diagram of the primary gateway and standby gateway connected to the bus according to some embodiments of the present disclosure.

FIG. 5 shows a schematic diagram of a primary gateway and a standby gateway connected to a bus in accordance with some embodiments of the present disclosure. The primary gateway 510 shown in FIG. 5 can be regarded as the one of the first gateway 110 and the second gateway 120 which is operating as the primary gateway, and the standby gateway 520 can be regarded as the other one of the first gateway 110 and the second gateway 120 which is operating as the standby gateway. By way of example, in the initialization of the bus 530, the primary gateway 510 can be initialized as a primary node, and the standby gateway 520 can be initialized as a floating master node.

The primary gateway 510 may have a first pin, such as a general-purpose input/output (GPIO) pin, and may output a first ON signal (e.g., a high level) via the first pin. The first ON signal may be used to control a first resistor associated with the primary gateway 510 to be connected to a circuit of the bus 530. Accordingly, the standby gateway 520 may have a second pin, such as a GPIO pin. The standby gateway 520 may output a first OFF signal, such as a low level, via the second pin. The first OFF signal is used to control a second resistor associated with the standby gateway 520 to be disconnected from the circuit of the bus 530.

In some embodiments, if a fault is detected associated with the primary gateway 510, the standby gateway 520 may itself become the master node, and may generate a second ON signal (e.g., high) and output the second ON signal via the second pin, to control the second resistor associated with the standby gateway 520 to be connected to the circuit of the bus 530. Accordingly, in the case where the standby gateway 520 operates in place of the primary gateway 510, the primary gateway 510 may output a second OFF signal via the first pin to control the first resistor to be disconnected from circuit of the bus 530.

In summary, according to embodiments of the present disclosure, in case that the communication line between the controller and the gateway suffers from a fault, the standby line can be started to ensure high availability. This achieves the reliability of the superior communication line. On the other hand, if a gateway is suffering from a fault, the standby gateway can be started to ensure high availability. This achieves the reliability of the gateway itself. Moreover, when there is a fault between the gateway and the internal bus, the standby line can be started to ensure high availability. This achieves the reliability of the subordinate internal bus. In this way, the stability and reliability of device communication can be improved.

Figure 6:
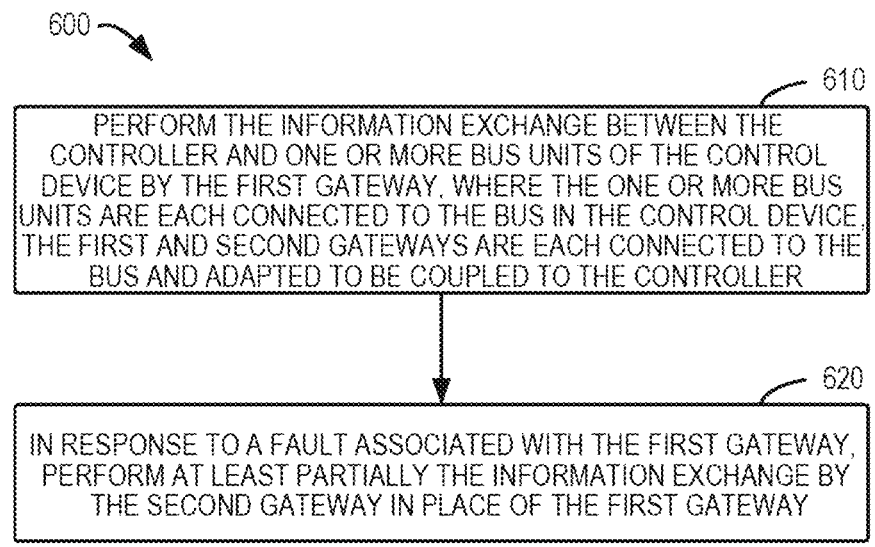
FIG. 6 shows a flowchart of an example control method according to some embodiments of the present disclosure.

FIG. 6 shows a flowchart of an example method 600 of a control method according to some embodiments of the present disclosure. The method 600 may be implemented, for example, at the control device 100. The method 600 is described below with reference to FIG. 1. It should be understood that the method 600 may include additional actions not shown and/or actions shown may be omitted, and the scope of the present disclosure is not limited in this respect.

At block 610, the information exchange between the controller and one or more bus units of the control device is performed by the first gateway 110, where the one or more bus units are each connected to the bus in the control device, the first gateway 110 and the second gateway are each connected to the bus and adapted to be coupled to the controller. At block 620, in response to a fault associated with the first gateway 110, the information exchange is performed at least partially by the second gateway in place of the first gateway 110.

In some embodiments, at least partially performing the information exchange by the second gateway in place of the first gateway 110 comprises: receiving operational status data from the first gateway by the second gateway during the first gateway performing the information exchange; monitoring, by the second gateway, the fault associated with the first gateway based on the operational status data; and in response to detecting the fault, at least partially performing the information exchange by the second gateway in place of the first gateway.

In some embodiments, the first and second gateways each include a control port and a detection port, and the first and second gateways are each adapted to be coupled to the controller through a respective control port, and the first and second gateways connected to each other through a respective detection port to exchange operational status data.

In some embodiments, the first and second gateways each comprise a control port, a connection port and a detection port, the first and second gateways are each adapted to be coupled to the controller via the respective control ports, the first and second gateways are connected to each other via the respective connection ports to exchange data from or to the controller, and the first and second gateways are connected to each other via the respective detection ports to exchange the operational status data.

In some embodiments, the first and second gateways each comprise a control port, a connection port and a detection port, the first and second gateways are each adapted to be coupled to the controller via the respective control ports, the first and second gateways are connected to each other via the respective connection ports to exchange data from or to the controller, and the first and second gateways are connected to each other via the respective detection ports to exchange the operational status data.

In some embodiments, the first and second gateways each comprise two control ports and a detection port, the first and second gateways are each adapted to be coupled to the controller via the respective two control ports, and the first and second gateways are connected to each other via the respective detection ports to exchange the operational status data.

In some embodiments, the method 600 further comprises: in response to detecting the fault associated with the first gateway, invalidating the correspondence between the first gateway address and the virtual address and validating a correspondence between the second gateway address and the virtual address by the second gateway.

In some embodiments, the first and second gateways each comprise a first switch and a second switch for setting a primary gateway and a standby gateway, and the method 600 further comprises: performing the information exchange by the first gateway as the primary gateway based on a first control signal from the first switch; and monitoring the fault associated with the first gateway by the second gateway as the standby gateway based on a second control signal from the second switch.

In some embodiments, the method 600 further comprises: outputting a first ON signal via a first pin by the first gateway to control a first resistor associated with the first gateway to be connected to a circuit of the bus; and outputting a first OFF signal via a second pin by the second gateway to control the second resistor associated with the second gateway to be disconnected from the circuit of the bus.

In some embodiments, the method 600 further comprises: in response to detecting the fault, generating a second ON signal and outputting the second ON signal via the second pin by the second gateway, to control the second resistor to be connected to the circuit of the bus; and in response to the second gateway operating in place of the first gateway, outputting a second OFF signal by the first gateway via the first pin, to control the first resistor to be disconnected from the circuit of the bus.

According to the example embodiments of the present disclosure, a machine-readable storage medium is also provided, on which machine-executable instructions are stored, wherein the machine-executable instructions are executed by a processor to implement the method described above. According to the exemplary implementation of the present disclosure, a program product is also provided, which is tangibly stored on a non-transient machine-readable medium and includes machine-executable instructions, and the machine-executable instructions are executed by the processor to implement the method described above.

Various aspects of the present disclosure are described herein with reference to flowcharts and/or block diagrams of methods, apparatus, equipment, and program products implemented according to the present disclosure. It should be understood that each block of the flowcharts and/or block diagrams and combinations of the blocks in the flowcharts and/or block diagrams can be implemented by machine-readable program instructions.

These machine-readable program instructions can be provided to processing units of general-purpose computers, special-purpose computers, servers, single-chip microcomputers and their clusters, or other programmable data processing devices to produce a machine that, when executed by a machine, programmable data processing device, and/or other device, produces a device that implements the functions/actions specified in one or more blocks in the flowchart and/or block diagram. These machine-readable program instructions can also be stored in a machine-readable storage medium, which causes the machine, programmable data processing device, and/or other device to operate in a specific way. Therefore, the machine-readable medium that stores the instructions includes a manufacturing article that includes instructions for implementing various aspects of the functions/actions specified in one or more blocks in the flowchart and/or block diagram.

Machine-readable program instructions can be loaded onto a machine, other programmable data processing device, or other device to perform a series of operational steps on the machine, other programmable data processing device, or other device to produce a machine-implemented process, so that the instructions executed on the machine, other programmable data processing device, or other device implement the functions/actions specified in one or more blocks in the flowchart and/or block diagram.

The flowcharts and block diagrams in the accompanying drawings show the possible architecture, functions, and operations of the systems, methods, and program products implemented in accordance with the present disclosure. In this regard, each block in the flowchart or block diagram may represent a module, program segment, or part of an instruction that contains one or more executable instructions for implementing the specified logical functions. In some alternative implementations, the functions marked in the blocks may also occur in a different order than those marked in the drawings. For example, two consecutive blocks can actually be executed in parallel, and they may sometimes be executed in the opposite order, depending on the functions involved. It should also be noted that each block in the block diagram and/or flowchart, as well as combinations of blocks in the block diagram and/or flowchart, can be implemented using a dedicated hardware-based system that performs the specified functions or actions, or can be implemented using a combination of dedicated hardware and machine instructions.

The above has described the various implementations of the present disclosure. The above description is exemplary, not exhaustive, and is not limited to the various implementations disclosed. Without departing from the scope and spirit of the various implementations described, many modifications and changes will be apparent to those skilled in the field. The terminology used in this article is intended to best explain the principles, practical applications, or improvements to the technology in the market, or to enable other ordinary technicians in the field to understand the various implementations disclosed in this article.

We claim:

1. A control device comprising:
    one or more bus units each connected to a bus in the control device; and
    a first gateway and a second gateway connected to each other, the first and second gateways each connected to the bus and adapted to be coupled to a controller,
    wherein the first gateway is configured to perform information exchange between the controller and the one or more bus units, and
    the second gateway is configured to, in response to a fault associated with the first gateway, at least partially perform the information exchange in place of the first gateway,
    wherein the first and second gateways each comprise a first switch and a second switch for setting a primary gateway and a standby gateway,
    the first gateway is further configured to perform the information exchange as the primary gateway based on a first control signal from the first switch, and
    the second gateway is further configured to monitor the fault associated with the first gateway as the standby gateway based on a second control signal from the second switch.

2. The control device of claim 1, wherein the second gateway is further configured to:
    receive operational status data from the first gateway during the first gateway performing the information exchange;
    monitor the fault associated with the first gateway based on the operational status data; and
    in response to detecting the fault, at least partially perform the information exchange in place of the first gateway.

3. The control device of claim 2, wherein the first and second gateways each comprise a control port and a detection port,
    the first and second gateways are each adapted to be coupled to the controller via the respective control ports, and
    the first and second gateways are connected to each other via the respective detection ports to exchange the operational status data.

4. The control device of claim 2, wherein the first and second gateways each comprise a control port, a connection port and a detection port,
    the first and second gateways are each adapted to be coupled to the controller via the respective control ports,
    the first and second gateways are connected to each other via the respective connection ports to exchange data from or to the controller, and
    the first and second gateways are connected to each other via the respective detection ports to exchange the operational status data.

5. The control device of claim 2, wherein the first and second gateways each comprise two control ports and a detection port,
    the first and second gateways are each adapted to be coupled to the controller via the respective two control ports, and
    the first and second gateways are connected to each other via the respective detection ports to exchange the operational status data.

6. The control device of claim 1, wherein the first gateway has a first gateway address and the second gateway has a second gateway address independent of the first gateway address, and the first gateway is configured to perform the information exchange according to a correspondence between the first gateway address and a virtual address accessible by the controller.

7. The control device of claim 6, wherein the second gateway is further configured to, in response to detecting the fault associated with the first gateway, invalidate the correspondence between the first gateway address and the virtual address, and to validate a correspondence between the second gateway address and the virtual address.

8. The control device of claim 1, wherein the first gateway is configured to output a first ON signal via a first pin to control a first resistor associated with the first gateway to be connected to a circuit of the bus; and
    the second gateway is configured to output a first OFF signal via a second pin to control the second resistor associated with the second gateway to be disconnected from the circuit of the bus.

9. The control device of claim 8, wherein the second gateway is further configured to, in response to detecting the fault, generate a second ON signal and output the second ON signal via the second pin to control the second resistor to be connected to the circuit of the bus; and
    the first gateway is configured to, in response to the second gateway operating in place of the first gateway, output a second OFF signal via the first pin to control the first resistor to be disconnected from the circuit of the bus.

10. A control method implemented at a control device comprising a first gateway and a second gateway connected to each other, the method comprising:
    performing, by the first gateway, information exchange between a controller and one or more bus units in the control device, the one or more bus units each connected to a bus in the control device, the first and second gateways each connected to the bus and adapted to be coupled to the controller; and
    in response to a fault associated with the first gateway, at least partially performing the information exchange by the second gateway in place of the first gateway,
    wherein the first and second gateways each comprise a first switch and a second switch for setting a primary gateway and a standby gateway, and the method further comprises:
    performing the information exchange by the first gateway as the primary gateway based on a first control signal from the first switch; and
    monitoring the fault associated with the first gateway by the second gateway as the standby gateway based on a second control signal from the second switch.

11. The control method of claim 10, wherein at least partially performing the information exchange by the second gateway in place of the first gateway comprises:
    receiving operational status data from the first gateway by the second gateway during the first gateway performing the information exchange;
    monitoring, by the second gateway, the fault associated with the first gateway based on the operational status data; and
    in response to detecting the fault, at least partially performing the information exchange by the second gateway in place of the first gateway.

12. The control method of claim 11, wherein the first and second gateways each comprise a control port, a connection port and a detection port,
    the first and second gateways are each adapted to be coupled to the controller via the respective control ports, the first and second gateways are connected to each other via the respective connection ports to exchange data from or to the controller, and the first and second gateways are connected to each other via the respective detection ports to exchange the operational status data.

13. The control method of claim 11, wherein the first and second gateways each comprise two control ports and a detection port, the first and second gateways are each adapted to be coupled to the controller via the respective two control ports, and the first and second gateways are connected to each other via the respective detection ports to exchange the operational status data.

14. The control method of claim 10, wherein the first and second gateways each comprise a control port and a detection port, the first and second gateways are each adapted to be coupled to the controller via the respective control ports, and the first and second gateways are connected to each other via the respective detection ports to exchange the operational status data.

15. The control method of claim 10, wherein the first gateway has a first gateway address and the second gateway has a second gateway address independent of the first gateway address, and wherein performing the information exchange by the first gateway comprises:

performing the information exchange by the first gateway according to a correspondence between the first gateway address and a virtual address accessible by the controller.

16. The control method of claim 10, further comprising:

outputting a first ON signal via a first pin by the first gateway to control a first resistor associated with the first gateway to be connected to a circuit of the bus; and outputting a first OFF signal via a second pin by the second gateway to control the second resistor associated with the second gateway to be disconnected from the circuit of the bus.

17. The control method of claim 16, further comprising:

in response to detecting the fault, generating a second ON signal and outputting the second ON signal via the second pin by the second gateway, to control the second resistor to be connected to the circuit of the bus; and in response to the second gateway operating in place of the first gateway, outputting a second OFF signal by the first gateway via the first pin, to control the first resistor to be disconnected from the circuit of the bus.

18. A non-transitory computer-readable storage medium having a computer program stored thereon, the computer program being executable by a processor to implement a method implemented at a control device comprising a first gateway and a second gateway connected to each other, the method comprising:

performing, by the first gateway, information exchange between a controller and one or more bus units in the control device, the one or more bus units each connected to a bus in the control device, the first and second gateways each connected to the bus and adapted to be coupled to the controller; and in response to a fault associated with the first gateway, at least partially performing the information exchange by the second gateway in place of the first gateway, wherein the first and second gateways each comprise a first switch and a second switch for setting a primary gateway and a standby gateway, the first gateway is further configured to perform the information exchange as the primary gateway based on a first control signal from the first switch, and the second gateway is further configured to monitor the fault associated with the first gateway as the standby gateway based on a second control signal from the second switch.

\* \* \* \* \*